April 21, 1970     N. P. DANN     3,507,297
ARTIFICIAL RESPIRATION APPARATUS
Filed June 23, 1964     3 Sheets-Sheet 2

INVENTOR.
Norman P. Dann
BY Robb & Robb
Attorneys.

April 21, 1970     N. P. DANN     3,507,297
ARTIFICIAL RESPIRATION APPARATUS
Filed June 23, 1964

INVENTOR.
Norman P. Dann
BY Robb & Robb
Attorneys.

United States Patent Office 3,507,297
Patented Apr. 21, 1970

3,507,297
ARTIFICIAL RESPIRATION APPARATUS
Norman P. Dann, 3393 Delwood Road,
Cleveland Heights, Ohio 44118
Filed June 23, 1964, Ser. No. 377,237
Int. Cl. A61m 16/00
U.S. Cl. 137—102                                                                                                                     6 Claims

ABSTRACT OF THE DISCLOSURE

This invention relates to artificial respiration apparatus of the intermittent positive pressure type, and is designed to produce involuntary respiration as required for initiating breathing of new born infants and in resuscitation of persons whose breathing has stopped.

The disclosure provides apparatus which is capable of meeting the requirements of a variety of conditions in respect to variation of rate of respiration, variation of volume of gas supplied on inhalation, and variation of the relation of inhalation time to exhalation time. This is accomplished by the provision of a novel cycling control valve for controlling inhalation and exhalation cycles of respiration automatically, and which is capable of adjustment to vary the relation between the length of the inhalation and exhalation cycles. This cycling control valve includes a rotatable plate member provided with two apertures therethrough which are of arcuate configuration having a common arcuate center, said apertures being symmetrical to a common radius extending from said common arcuate center.

The rotatable plate member is adjustable to varying rotative positions so as to provide communication through the arcuate openings from the oxygen supply port, and the exhalation port in varying relation so as to vary the relative length of the inhalation and exhalation cycles. Control of the rate of respiration is effected by varying the rate of rotation of said rotatable member.

The disclosure also provides a novel exhalation valve which is responsive to extremely low pressures to permit exhalation in case of weak respiration, said exhalation valve including a diaphragm normally engageable with the oxygen supply port, and displaceable to engage with the valve seat provided for the exhalation port.

---

My present invention relates to artificial respiration and aspiration apparatus and more particularly appertains to respiration apparatus of the intermittent positive pressure type and is especially useful for purposes of producing involuntary respiration as required for initiating breathing of new born infants and in resuscitation of persons whose breathing has stopped.

For such purposes it is desirable that such apparatus be capable of meeting the requirements of a variety of conditions in respect to variation of rate of respiration, variation of the volume of gas supplied on inhalation, and variation of the relation of inhalation time to exhalation time.

In this connection it may be noted that in the use of such apparatus there may be requirements ranging from a relatively slow rate of respiration for adults and a much higher rate of respiration for infants. In some cases the physician directing employment of the respiration apparatus may wish to have the same adjusted so as to provide a relatively short inhalation time with a relatively high pressure of the oxygen supply and a much longer exhalation time or he may wish to have the apparatus adjusted so as to provide a longer inhalation time at relatively lower pressure of oxygen supply and a relatively shorter exhalation time.

It is therefore a principal object of my invention to provide reliable respiration apparatus capable of meeting the various conditions referred to.

It is a further principal object of my invention to provide such apparatus which is of relatively simple construction, easy and safe to use and which requires a minimum amount of maintenance over a long period of use.

A further object and feature of my invention is the provision of a novel cycling control valve for controlling inhalation and exhalation cycles of respiration automatically which is of extremely simple and relatively maintenance free construction and which is capable of simple adjustment to vary the relation between the length of the inhalation and exhalation cycles.

A further object of the invention is to provide aspiration means which may be employed in conjunction with the respiration apparatus in cases where it is desired to withdraw accumulated mucous from a person's mouth or throat by use of an aspirator tube inserted therein and while respiration is being administered.

A still further object of the invention is to provide an improved exhalation valve designed to minimize dead air space in the oxygen supply system and to facilitate exhalation responsive to weak exhalation pressures, particularly in the case of infants.

In the latter connection, the basic problem is to provide an exhalation valve which is responsive to extremely low pressures to permit exhalation in the case of weak respiration such as that of newly born infants and to provide such a valve which is reliable in operation even though the valve becomes moist from the condensation of water vapor in the exhaled breath. The exhalation valve of the present invention has been found to be eminently satisfactory in meeting these problems.

Other objects, advantages and features of the invention will become apparent from the following detailed description taken in conjunction with the accompanying drawings in which.

Figure 1:
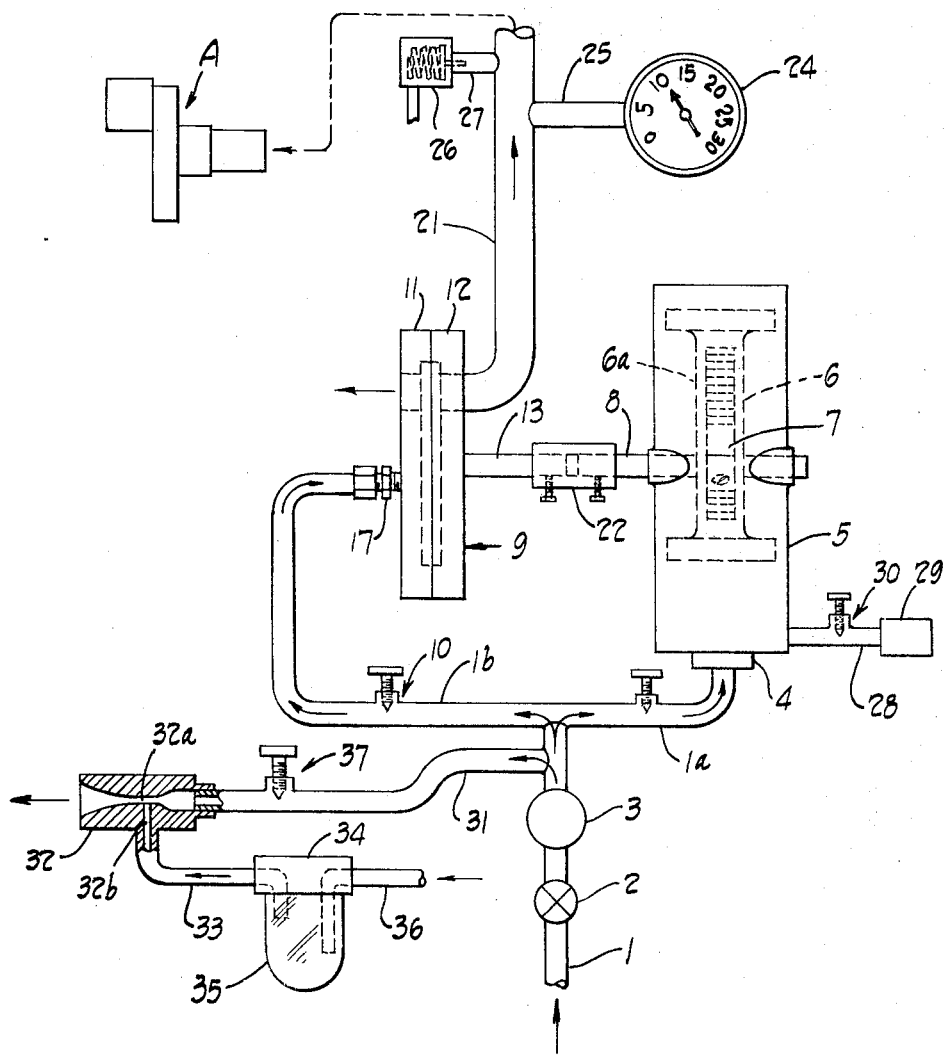
FIGURE 1 is a schematic view of respiration and aspiration apparatus embodying my invention.
Figure 2:
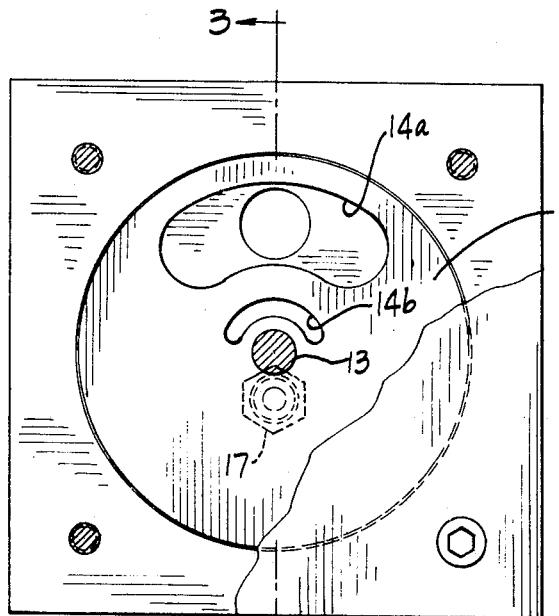
FIGURE 2 is an elevation of the cycling control valve.
Figure 3:
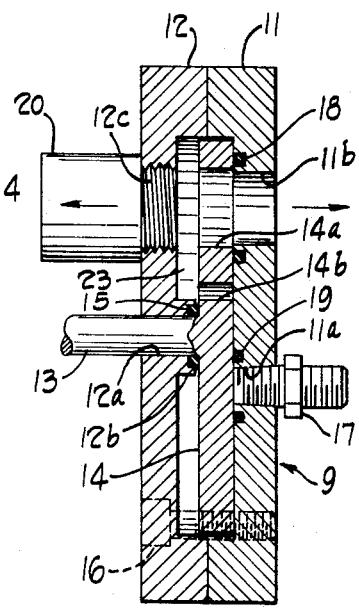
FIGURE 3 is a sectional view taken on the line 3—3 of FIGURE 2.
Figure 4:
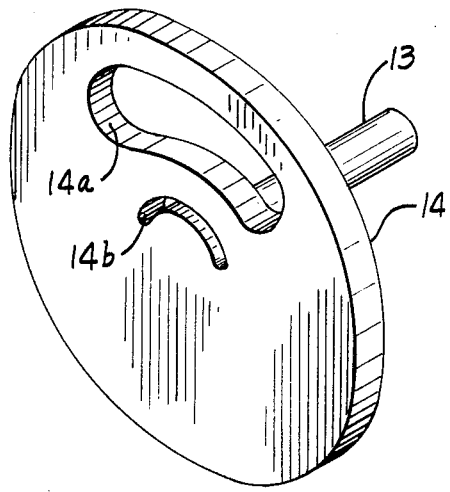
FIGURE 4 is a perspective view of the movable valve member of the cycling valve and its associated operating shaft.
Figure 5:
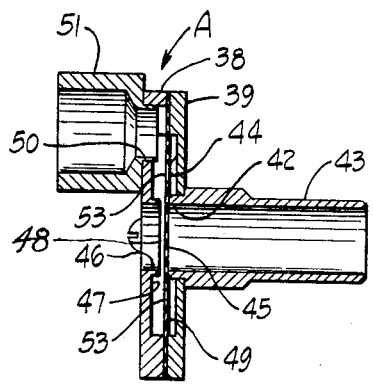
FIGURE 5 is a vertical sectional view through the exhalation valve.
Figure 6:
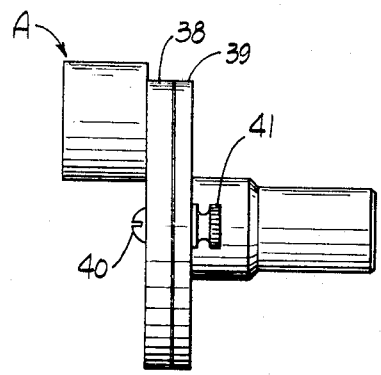
FIGURE 6 is a side elevation of the same.
Figure 7:
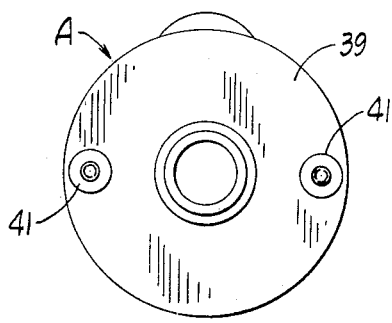
FIGURE 7 is an end elevation looking toward the right end of FIGURE 6.
Figure 8:
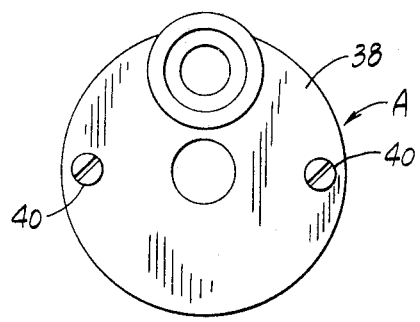
FIGURE 8 is an end elevation looking toward the left end of FIGURE 6.
Figure 9:
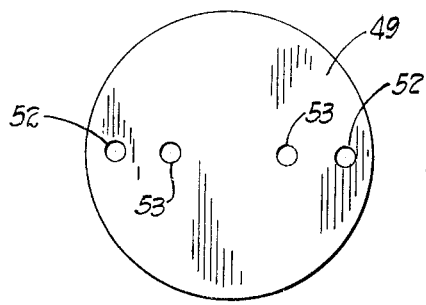
FIGURE 9 is a plan view of the diaphragm for the exhalation valve.

Referring now to the drawings and describing the invention in detail, the respiration and aspiration apparatus embodying my invention as illustrated in FIGURE 1 comprises a completely pneumatic system utilizing any suitable source of supply of oxygen or other clean gas under pressure as the source of energy for operation of the system.

The numeral 1 indicates a conduit leading from such a suitable source of supply of oxygen under pressure to a main shut-off valve 2 and thence to a pressure reducing regulator 3 of conventional form at which point in the line 1 the oxygen pressure is reduced to twenty pounds per square inch preferably. From the reducing regulator 3 oxygen at reduced pressure is conducted through a branch conduit 1a to a suitable piston cycle valve 4 of a pneumatic motor 5 of a conventional type. The motor 5 comprises a cylinder within which a piston 6 reciprocates. The valve 4 operates to direct gas pressure from the branch line 1a first to one end of the cylinder and then to the other end of the same. As the piston 6 reaches one end of its excursion within the cylinder the piston cycle valve automatically trips so as to direct the gas pressure from branch line 1a to that end of the piston 6 which will serve to reverse the reciprocatory movement thereof within the cylinder.

The piston 6 is provided with a rack section 6a which meshes with the teeth of a sector gear 7 fixed to a shaft 8 extending through and suitably rotatably journaled in the housing of the motor 5, whereby, as the piston 6 reciprocates within the motor cylinder, the shaft 8 will be caused to rotate first in one direction through a given arc and then caused to rotate in the opposite direction through the same arc. For the purposes of my invention I preferably design the motor 5 to cause oscillatory rotation of the shaft 8 through an arc of 130 degrees.

From the pressure regulator 3 the oxygen at reduced pressure is also conducted through a branch conduit 1b to a respiration cycling valve generally designated by the numeral 9, the passage of gas through the branch line 1b being under the control of a volume valve 10. The novel respiration cycling control valve of my invention comprises a housing consisting of two sections 11 and 12 suitably joined together as by screws or like means 16. The section 12 is provided with a suitable bearing opening 12a therethrough which serves to journal the rotatable shaft 13 to one end of which is integrally secured concentrically thereof a circular valve control plate 14. The section 12 is formed with a hub portion 12b extending around the opening 12a, the hub portion being provided with an annular groove within which is seated an O-ring type seal 15 which fits tightly around the shaft 13 so as to prevent fluid leakage from the interior of the valve housing through the bearing opening 12a.

Section 11 of the valve 9 is provided with an inlet port 11a and an exhaust port 11b. The inlet port 11a is threaded to receive a threaded fitting 17 to which the branch conduit 1b is connected. The said section 11 is provided with an annular recess surrounding the exhaust port 11b said annular recess receiving an O-ring type seal 18. Similarly the section 11 is provided with an annular recess surrounding the inlet port 11a which recess also receives an O-ring type seal 19. The seals 18 and 19 normally protrude from the respective recesses and are tightly engaged by the flat face of the valve plate 14 so as to prevent fluid leakage between abutting faces of the said plate 14 and the housing. In view of the use of the O-ring type seals 15, 18 and 19 in the manner indicated any tolerance between the face plate and the housing of the valve 9 is not critical.

Section 12 of the valve 9 is provided with an oxygen supply port 12c which is threaded to receive a suitable fitting 20 to which oxygen supply conduit 21 is connected, said conduit 21 communicating with a suitable face mask which may be applied to the face of a patient for purposes of producing artificial respiration in the patient by the use of the apparatus of the invention. It will be noted that the supply port 12c and the exhaust port 11b are of substantially the same size and are arranged in the respective sections 11 and 12 in such a manner as to register with one another, the said ports 11b and 12c being of sufficient size to permit passage of an adequate volume of gas both to and from the patient's lungs within a short space of time as required for the inhalation and exhalation cycles of the respiration apparatus, since the inhalation of oxygen from the apparatus and the exhalation of gas from the patient's lungs must take place through the same conduit 21, if exhalation valve A is not used. On the other hand, the inlet port 11a is preferably of much smaller size.

The valve plate 14 is provided with an arcuate aperture 14a therethrough, the width of the aperture being equal to the diameter of the ports 12c and 11b, said aperture 14a having its arcuate configuration concentric with the shaft 13 and being arranged so as to be capable of registry with the ports 11b and 12c when the plate 14 is rotated to a position relative to the valve housing permitting such registry. The extreme ends of the aperture 14a comprise arcs of circles having the same diameter as the ports 12c and 11b. The arcuate length of aperture 14a is preferably approximately 70 degrees between the centers of those circles.

The valve plate 14 is further provided with another arcuate aperture 14b therethrough located between the aperture 14a and the shaft 13, the arc of the aperture 14b being concentric with the shaft 13, and the apertures 14a and 14b being symmetrical to a common radius of shaft 13. The aperture 14b has a width substantially equal to the diameter of the inlet port 11a and is arranged so as to be capable of registry with said port 11a when the valve plate 14 is rotated to a corresponding position relative to the valve housing. The extreme ends of the aperture 14b comprise arcs of circles having the same diameter as that of port 11a. The arcuate length of aperture 14b is preferably approximately 138 degrees between the centers of those circles.

Shaft 13 of the cycling valve 9 is coupled to the output shaft 8 of the pneumatic motor 5 by means of an adjustable coupling 22 which, when loosened, permits one of these shafts to rotate relative to the other so that the same may be rotatably adjusted with respect to one another, and when the coupling 22 is tightened, the shafts 8 and 13 will rotate together as a unit. Thus the interval of oscillatory rotation of the valve plate 14 during which the aperture 14b may be caused to be in register with the inlet port 11a may be adjusted relative to the interval during which the aperture 14a is permitted to come into register with the ports 11b and 12c during the respiratory cycle. It will be noted that the arrangement of the apertures 14a and 14b is such that whenever the aperture 14a is in register with ports 11b and 12c the aperture 14b will be out of register with the inlet port 11a and likewise whenever the aperture 14b is in register with the inlet port 11a the aperture 14a will be out of register with the ports 11b and 12c. It will be further noted that the aperture 14b is of sufficient arcuate length so that whenever said aperture 14b is in partial registry with the inlet port 11a said aperture 14b will at the same time be in communication with the chamber 23 provided by a recessed portion of the housing section 12 on one side of the rotatable valve plate 14 so as to permit passage of oxygen from inlet port 11a through aperture 14b to chamber 23 and thence to supply port 12c under such condition.

A pressure gauge 24 may be connected by a branch conduit 25 to the oxygen supply conduit 21 so as to indicate the oxygen pressure in the said supply line 21. Additionally a spring loaded blow-off valve 26 communicating through branch conduit 27 with supply conduit 21 is provided to open whenever the oxygen pressure in the supply conduit 21 exceeds a predetermined safe limit so that unsafe oxygen supply pressures will not be communicated to the lungs of the patient using the respirator. Valve 26 is normally adjusted to blow off at 50 cm. of water pressure.

It may be further noted that the exhaust port of the pneumatic motor 5 is in communication with a conduit 28 leading to a muffler 29 and exhaust of gas from the cylinder of the motor 5 is under control of a needle valve 30 provided in the conduit 1a whereby adjustment of said needle valve 30 will vary the rate of reciprocation of the piston 6 and thereby serve to vary the number of respiratory cycles per minute produced by the respiration apparatus of the invention.

Aspiration means is provided in conjunction with the system of the invention and for this purpose a branch conduit 31 leads from the supply conduit 1 beyond the reducing valve 3, said conduit 31 communicating with a venturi 32 having a restricted passage 32a the other end of the said passage leading to atmosphere. A passage 32b leads from the restricted passage 32a so as to be in communication with a conduit 33 which may pass through a cover 34 into a suitable container such as a jar or the like 35, the cover 34 being connected to the container 35 in air tight relation. An aspirator tube leads from the interior of the container 35 through the cover 34 and the opposite end of said aspirator tube may be placed in the patient's mouth or throat to withdraw accumulated mucous therefrom and convey it to the interior of the container 35, the effect of the venturi being to create a negative pressure within the container 35 so as to suck the mucous from the patient through the aspirator tube 36.

It will be seen from the foregoing that the system of my invention described provides both for artificial respiration and for aspiration. The aspiration means may be cut off from the oxygen supply by operation of the valve 37 when desired.

In the operation of the apparatus for inducing artificial respiration, the valve 2 will be opened to admit oxygen to the system, the valve 10 will be regulated to provide the supply of the desired volume of oxygen to the patient supply conduit 21 through the respiration cycling valve 9 and at a desired pressure of oxygen in the conduit 21 as indicated by the pressure gauge 24. The rate of cycling of the cycling control valve 9 will be regulated by manipulation of the valve 30 to produce the desired number of reciprocations per minute of the piston 6 which in turn will produce the corresponding number of oscillatory rotative movements of the valve plate 14. By suitable adjustment of the coupling 22 with respect to the shafts 8 and 13 the arcuate travel of the valve plate 14 and hence of the apertures 14a and 14b may be varied in such manner as desired to determine the inhalation and exhalation time of each respiratory cycle. For example, a normal adjustment would be an inhalation phase of 30% of the total respiratory cycle and an exhalation phase of 70% of said respiratory cycle, a longer time interval for expulsion of gas from the lungs of the patient being normally required as compared with the time interval during which oxygen under pressure is supplied to the patient's lungs. Thus the shafts 8 and 13 would be adjusted relative to one another through the adjustable coupling means 22 so as to permit the oscillatory rotation of the valve plate 14 in such manner that the aperture 14a would be in register with the ports 12c and 11b during 70% of the respiratory cycle while the aperture 14b would be in registry with the inlet port 11a during 30% of the respiratory cycle.

Referring now to FIGURES 5 through 9 inclusive, the automatic exhalation valve comprises two sections 38 and 39 joined together by bolts 40 having cooperating knurled nuts 41 thereon. The section 39 has a central oxygen supply inlet port 42 communicating with an integral tubular fitting 43 adapted to receive and communicate with the oxygen supply conduit 21. The section 39 is further provided with a shallow interior recess 44 surrounding the inwardly offstanding circular valve seat 45 surrounding and inwardly offstanding from the oxygen supply port 42

The section 38 is provided with a central exhaust port 46 axially aligned with the oxygen inlet port 42. Said section 38 is also provided with a shallow recess 47 interiorly thereof which surrounds the inwardly disposed circular valve seat 48 for the port 46. Secured between the opposing faces of the sections 38 and 39 is a very thin flexible diaphragm 49 which also serves as a sealing gasket between the sections 38 and 39. This diaphragm 49 is preferably made of neoprene coated nylon fabric approximately .007 inch thickness which is strong, limp, flexible, and non-stretchable as well as impervious to the passage of air therethrough. This diaphragm 49 is also preferably slightly deformed so as to be of slightly concavo-convex configuration so as to provide additional area between the points of securement to enable a displacement thereof approximately one-sixteenth inch between intake and exhaust positions assumed thereby when in seating engagement with the seats 45 and 48 respectively.

The valve seat 45 for the oxygen intake supply port 42 lies in the plane of the inner face of the section 39 while the valve seat 48 is disposed outwardly of the inner face of the section 38 so that at zero pressure the diaphragm is in seating engagement with the seat 45 and displaced in spaced relation to the seat 48 whereby the exhalation valve designated as a whole by the letter A is open to exhaust; that is to say, the outlet port 50 is in communication through the recess 47 with the exhaust port 46. The outlet port 50 communicates with a tubular fitting 51 providing a connector adapted to connect and communicate with the conduit leading to a face mask or an endotracheal tube adapter.

The diaphragm 49 is provided with apertures 52 through which the bolts 40 extend and said diaphragm is also provided with apertures 53 offset from the ports 42 and 46 and providing communication between the recesses 44 and 47.

Thus in operation of the exhalation valve A, on the inhalation cycle of the operation of the respiration apparatus the pressure of oxygen at the inlet port 42 will displace the diaphragm 49 away from the seat 45 into seating engagement with the seat 48 thereby closing the exhaust port 46 and permitting oxygen entering the fitting 43 to pass through the inlet port 42 into the recess 44 and through the apertures 53 of the diaphragm 49 into the recess 47 and thence through the outlet port 50 and through the fitting 51 to the oxygen mask or endotracheal tube adapter, whichever is connected to the fitting 51.

During the exhalation cycle of the respiration cycling valve there will be no positive oxygen supply pressure acting on the diaphragm 49 of valve A since exhaust port 11b of the respiration cycling valve is then open to atmosphere. In this condition diaphram 49 relaxes to its normal zero pressure position in seating engagement with valve seat 45 and displaced from seat 48, thereby opening exhaust port 46 to atmosphere and permitting expired gas to escape to atmosphere with virtually no resistance. It will be understood, of course, that the respiration apparatus herein disclosed may be used with or without the exhalation valve A. When valve A is not used, exhalation will take place from the face mask through conduit 21 and exhaust port 11b of the respiration cycling valve. When valve A is inserted in conduit 21, exhalation will take place through exhaust port 46 of valve A, during the exhalation cycle of the respiration cycling valve.

A thin gasket may be provided between the sections 11, 12 of the cycling control valve.

From the foregoing it will be apparent that the invention provides a versatile respiration apparatus which is reliable in operation, simple in construction, and relatively maintenance free and which will be at the same time safe for its intended use, it being noted that the system being entirely pneumatic eliminates the possibility of explosion or other hazards which might arise from operation of electrical or other types of apparatus.

I claim:

1. Artificial respiration apparatus comprising, in combination, a source of supply of oxygen under pressure, conduit means communicating with said source and adapted to supply oxygen from said source to a patient supply end of said conduit means, cycling control valve means in said conduit to control passage of oxygen therethrough and to control exhaust of gas from said supply end to an exhalation port of said valve means in regular cycles, each cycle including an inhalation phase and an exhalation phase, said cycling control valve means comprising a housing having an inlet port, a patient supply port, and an exhalation port, said inlet port providing communication from the oxygen supply end of said conduit means to the interior of the housing, said patient supply port providing communication from the interior of said housing to the patient end of said conduit means, a rotatable member rotatably mounted in said housing, said rotatable member having a first aperture arranged to provide communication between said inlet port and said patient supply port when said rotatable member is in a given rotative position, said rotatable member having a second aperture arranged to provide communication between said patient supply port and said exhalation port when said rotatable member is in a given rotative position, the arrangement of said apertures being such that in certain rotative positions of the rotatable member the first aperture provides communication between the inlet and patient supply ports, while said rotatable member prevents communication between the patient supply and exhalation ports, and when the rotatable member is in certain other rotative positions the second aperture provides communication between the patient supply and exhalation ports while said rotatable member prevents communication between the inlet and patient supply ports, and means for rotating said rotatable member to provide predetermined intervals of oxygen supply to the patient end of said conduit means and alternate predetermined intervals of communication between the patient end of said conduit means and said exhalation port, combined with means for varying the length of the inhalation and exhalation cycles relative to one another.

2. Apparatus as claimed in claim 1, combined with an exhalation valve in said patient supply end of said conduit means, said exhalation valve comprising a housing consisting of two connected sections, and a diaphragm clamped between opposing faces of said sections, one of said sections including an inlet port connected to said oxygen supply and a valve seat for said latter inlet port engageable with said diaphragm and having a recess in said section surrounding said valve seat, the other of said sections having an exhalation port having a valve seat engageable by said diaphragm for closing thereof upon displacement of the diaphragm from closing engagement with the latter inlet port valve seat, responsive to pressure of oxygen at said latter inlet port during the inhalation cycle, said latter section also having an outlet port connected to said patient supply end of said conduit means, said outlet port being in communication with said latter exhalation port when the diaphragm is in closing engagement with the inlet port, said diaphragm having apertures therethrough offset from the latter inlet and exhalation ports to provide communication between the latter inlet and outlet ports when the diaphragm is displaced from the valve seat of the latter inlet port and seated against the exhalation port valve seat.

3. Apparatus as in claim 1, wherein the means for rotating said rotatable member comprises a pneumatic motor including a cylinder, a piston reciprocable in said cylinder, means interconnecting said piston and said rotatable plate member for rotation of the latter responsive to reciprocation of said piston, and said means for varying the relative length of the inhalation and exhalation cycles includes means for varying the rotative relation of said rotatable plate member with respect to said interconnecting means, whereby to adjust the rotative relation of the rotatable plate member to vary the relative lengths of the inhalation and exhalation cycles.

4. Apparatus as in claim 1, wherein the means for rotating said rotatable member comprises a pneumatic motor including a cylinder, a piston reciprocable in said cylinder, means interconnecting said piston and said rotatable plate member for rotation of the latter responsive to reciprocation of said piston, and said means for varying the relative length of the inhalation and exhalation cycles includes means for varying the rotative relation of said rotatable plate member with respect to said interconnecting means, whereby to adjust the rotative relation of the rotatable plate member to vary the relative lengths of the inhalation and exhalation cycles, and means for varying the rate of reciprocation of said piston.

5. Cycling means for artificial respiration apparatus, said control means comprising a housing having an inlet port adapted to be connected to a source of supply of oxygen, a patient supply port, and an exhalation port; a rotatable plate member rotatably mounted in said housing, said plate member having a first aperture therethrough providing communication between said inlet and said patient supply ports when said plate member is in certain rotative positions, and said plate member having a second aperture therethrough providing communication between said patient supply and exhalation ports when said plate member is in certain other rotative positions, the arrangement of the apertures being such that in certain rotative positions said plate member provides communication through the first aperture while preventing communication through the second aperture and in certain other rotative positions said plate member provides communication through the second aperture while preventing communication through the first aperture, whereby a given arc of rotation of said plate member will provide first an interval of communication through said first aperture and then an interval of communication through said second aperture.

6. Cycling control means for artificial respiration apparatus, said control means comprising a housing having an inlet port, a patient supply port, and an exhalation port; a rotatable member rotatably mounted in said housing, said member having a first aperture providing communication between said inlet and said patient supply ports when said member is in certain rotative positions, and said member having a second aperture providing communication between said patient supply and exhalation ports when said member is in certain other rotative positions, the arrangement of the apertures being such that in certain rotative positions said member provides communication through the first aperture while preventing communication through the second aperture and in certain other rotative positions said member provides communication through the second aperture while preventing communication through the first aperture, whereby a given arc of rotation of said member will provide first an interval of communication through said first aperture and then an interval of communication through said second aperture, wherein said apertures are of arcuate configuration having a common arcuate center, said apertures being symmetrical to a common radius extending from said common arcuate center.

References Cited

UNITED STATES PATENTS

| 2,273,790 | 2/1942 | Raymond | 137—64 X |
| 2,316,052 | 4/1943 | Dach | 137—624.14 X |
| 2,483,722 | 10/1949 | Bennett | 128—142 X |
| 2,923,290 | 2/1960 | Elam | 128—29 |
| 3,242,921 | 3/1966 | Seeler | 128—29 |
| 3,265,061 | 8/1966 | Gage | 128—29 |
| 3,357,428 | 12/1967 | Carlson | 128—145.8 |

FOREIGN PATENTS

| 1,031,887 | 3/1953 | France. |

WILLIAM F. O'DEA, Primary Examiner

R. GERARD, Assistant Examiner

U.S. Cl. X.R.

128—145.8; 137—624.14, 624.15, 625.21; 251—250